US007620780B1

(12) United States Patent
Anderson

(10) Patent No.: US 7,620,780 B1
(45) Date of Patent: Nov. 17, 2009

(54) MULTIPROCESSOR SYSTEM WITH CACHE CONTROLLED SCATTER-GATHER OPERATIONS

(75) Inventor: James B. Anderson, Santa Cruz, CA (US)

(73) Assignee: XILINX, Inc., San Jose, CA (US)

( * ) Notice: Subject to any disclaimer, the term of this patent is extended or adjusted under 35 U.S.C. 154(b) by 487 days.

(21) Appl. No.: 11/657,185

(22) Filed: Jan. 23, 2007

(51) Int. Cl.
*G06F 12/00* (2006.01)
(52) U.S. Cl. .......................... 711/149; 711/131; 712/31
(58) Field of Classification Search ................ 711/149, 711/131; 712/31
See application file for complete search history.

(56) References Cited

OTHER PUBLICATIONS

Anderson, James B., "A Generic DMA IP Core Interface for FPGA Platform Design" filed Aug. 30, 2006, pp. 1-14, U.S. Appl. No. 11/513,565, available from Xilinx, Inc., 2100 Logic Drive, San Jose, CA 95124.
Anderson, James B., "Direct Memory Access-Based Multi-Processor Array", filed Aug. 30, 2006, pp. 1-27, U.S. Appl. No. 11/513,575, available from Xilinx, Inc., 2100 Logic Drive, San Jose, CA 95124.
Bailey, David H., "A High-Performance FFT Algorithm for Vector Supercomputers", Nov. 23, 1987, pp. 1-9, vol. 2, No. 1, International Journal of Supercomputer Applictions, available from NASA Ames Research Center, Moffett Field, CA 94035.
Bailey, David H., "Unfavorable Strides in Cache Memory Systems", Dec. 9, 1994, pp. 1-10, vol. 4, Scientific Programming, available from NASA Ames Research Center, Moffett Field, CA 94035.

*Primary Examiner*—Brian R Peugh
*Assistant Examiner*—Hashem Farrokh
(74) *Attorney, Agent, or Firm*—LeRoy D. Maunu

(57) ABSTRACT

Dynamic cache architecture for a multi-processor array. The system includes a plurality of processors, with at least one of the processors configured as a parent processor, and at least one of the processors configured as a child processor. A data cache is coupled to the parent processor, and a dual port memory is respectively associated with each child processor part and parcel of a unified memory architecture. The parent processor may then dynamically distribute sub-cache components to dual-port memories based upon a scatter-gather work unit decomposition pattern. A parent cache controller reads, in response to a memory request from a child processor and an address translation pattern from the parent processor, a set of data from non-contiguous addresses of the data cache according to the address translation pattern, and writes the set of data to contiguous addresses of the dual port memory associated with the requesting child processor.

20 Claims, 6 Drawing Sheets

MULTIPROCESSOR SYSTEM WITH CACHE CONTROLLED SCATTER-GATHER OPERATIONS

FIELD OF THE INVENTION

The present invention generally relates to scatter-gather data caching for a multi-processor system.

BACKGROUND

A multiprocessor array is useful in applications in which a task may be divided into individual units of work, and the units of work distributed amongst the processors in the array. One example is the implementation of a Fast Fourier Transform (FFT) for digital signal processing applications. In these types of applications, one of the processors is configured or programmed to operate as the scatter-gather (S-G) processor, and the other processors are programmed to process the units of work ("data path processors" or DPPs).

The scatter operation performed by the S-G processor involves selecting for each processor the unit of work to be processed by that processor and providing the unit of work to that processor. The gather operation, also performed by the S-G processor, involves collecting completed units of work from the processors and assembling a data set that represents the completed task. In many applications, each unit of work provided to a processor is a subset of an input data set. Thus, the scattering of units of work often involves moving data to local memories or caches of the processors.

For each of the DPPs, the S-G processor reads from a memory the required subset of data and writes that data to a memory resource local to the DPP. Once a DPP has completed its unit of work, the S-G processor reads the completed data from the DPP's local memory and writes the necessary data to the S-G processor's local memory. Thus, the S-G processor may be involved with two read operations and two write operations for each DPP involved in processing the task. These read and write operations may consume considerable resources of the S-G processor and prevent the S-G processor from suitably performing other processing tasks.

The present invention may address one or more of the above issues.

SUMMARY OF THE INVENTION

The various embodiments of the invention provide systems and methods for cache controlled scatter-gather operations. In one embodiment, an electronic system comprises a plurality of processors, a data cache, at least two dual port memories, and a parent cache controller. At least one of the processors is configured as a parent processor, and at least two of the plurality of processors configured as child processors of the parent processor. The parent processor is configured to determine an address translation pattern for each of the child processors and respective sets of data to be processed by the child processors. The dual port memories are respectively associated with the child processors, and each dual port memory has a first port coupled to the data cache, and a second port coupled to the associated child processor. The parent cache controller is coupled to the parent processor, to the data cache, and to the first port of each dual port memory. The parent cache controller is configured to read, in response to a memory request from a child processor and the address translation pattern from the parent processor, a set of data from non-contiguous addresses of the data cache according to the address translation pattern, and write the set of data to contiguous addresses of the dual port memory associated with the requesting child processor.

In another embodiment, a method is provided for distributing a plurality of sets of data for processing. The method comprises, for each set of data, determining a main base memory address and an associated template that describes a non-contiguous pattern of addressing each word in the set of data in main memory. Each main base memory address is communicated from a parent processor to a respective one of a plurality of child processors. Each set of data is assigned to and associated with a respective one of the child processors. Each child processor contiguously addresses in a respective local memory coupled to the child processor, words of the set of data associated with the child processor. In response to a read request from a child processor, the read request including an address that references a word in the set of data associated with the child processor and the referenced word not being present in the local memory of the child processor, a plurality of words of the data set are read from main memory addresses, including the referenced word. The addresses of the plurality of words are non-contiguous according to the pattern of addressing for the set of data. The plurality of words of data is written to contiguous addresses of the local memory of the child processor.

An apparatus is provided in another embodiment for distributing a plurality of sets of data for processing. The apparatus comprises: means for determining for each set of data, a main base memory address and an associated template that describes a non-contiguous pattern of addressing each word in the set of data in main memory; means for communicating each main base memory address from a parent processor to a respective one of a plurality of child processors, wherein each set of data is assigned to and associated with a respective one of the child processors; means for contiguously addressing by each child processor in a respective local memory coupled to the child processor, words of the set of data associated with the child processor; and means, responsive response to a read request from a child processor, the read request including an address that references a word in the set of data associated with the child processor and the referenced word not being present in the local memory of the child processor, for reading from main memory addresses a plurality of words of the data set including the referenced word, wherein addresses of the plurality of words are non-contiguous according to the pattern of addressing for the set of data, and for writing the plurality of words of data to contiguous addresses of the local memory of the child processor.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention provide a multiprocessor array in which the scatter-gather process is implemented in cache-based hardware. The requisite data for the data path (DP) processors (or "child processors") is dynamically distributed by cache control mechanisms, thereby freeing the scatter-gather (SG) processor from involvement in the data transfer. Instead of having the SG processor read, for each DP processor, the needed subset of data from its cache and write the subset of data to the local memory of the DP processor, the data transfer task is delegated to a cache controller. Furthermore, the SG processor determines a pattern by which each DP processor is to access the subset of data and provides a description of the pattern to the cache controller. The cache controller uses the pattern to translate an address from the DP processor to a memory address and retrieve the requested data along with additional data of the subset as a line of data to the local cache of the DP processor. Thus, scatter-gather operations are effectively transferred to hardware cache-control with SG Processor (SGP) involvement limited to generation and application of associated hierarchical control. In this sense, SGP may be considered a "parent" processor.

Figure 1:
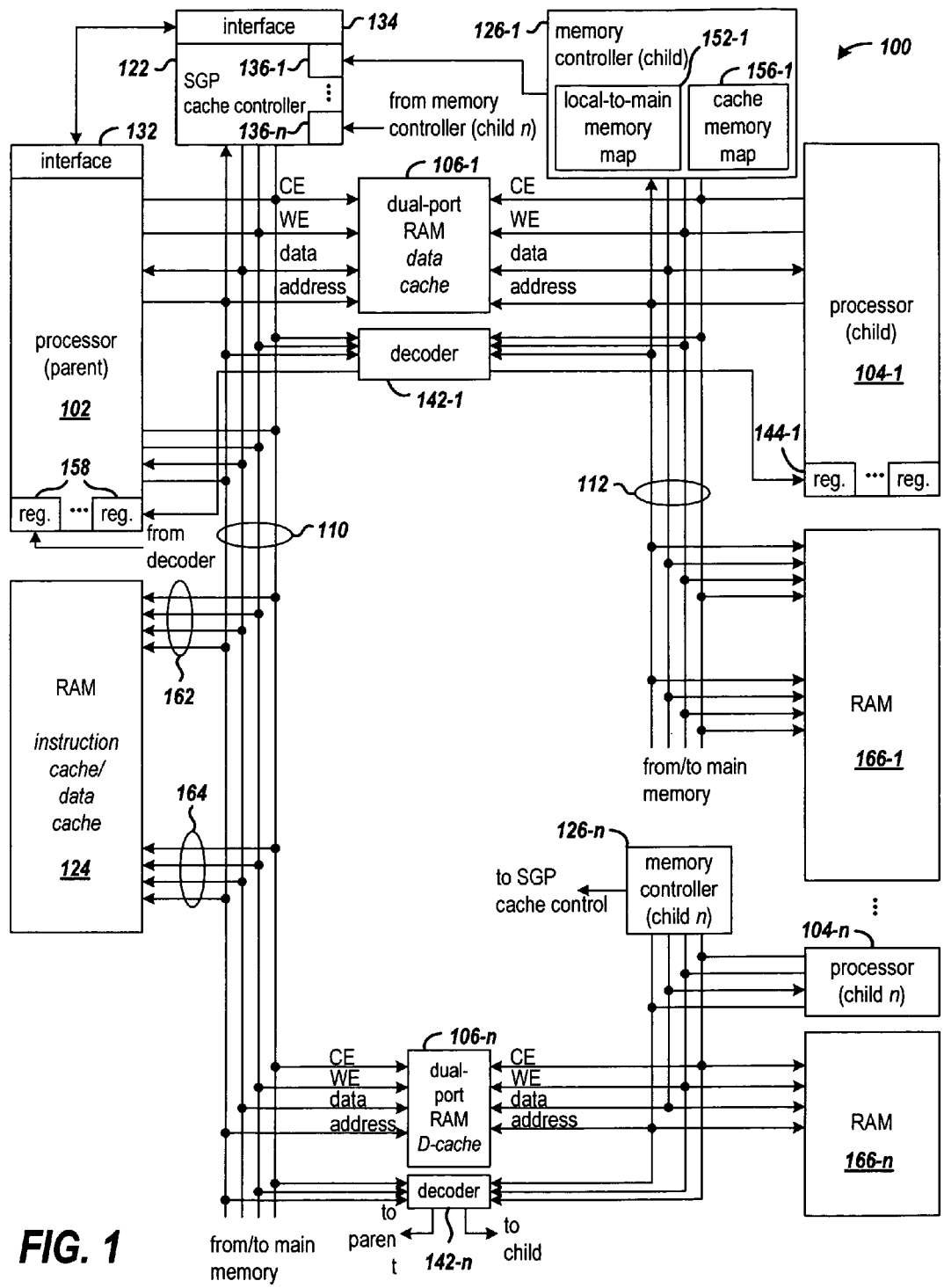
FIG. 1 is a block diagram that illustrates a multiprocessor array configured in accordance with one or more embodiments of the invention.

FIG. 1 is a block diagram that illustrates a multiprocessor array 100 configured in accordance with one or more embodiments of the invention. The multi-processor array is configured with a parent processor 102 that controls the distribution of units of work to a selected number of child processors 104-1-104-n. Each child processor has an associated dual-port RAM that is used for distributing unit of work data from the parent processor for local processing by the child processor. For example, child processor 104-1 has RAM 106-1 available to operate as its local memory, and child processor 104-n has RAM 106-n available for its local memory. The parent processor 102 is coupled via bus 110 to each of the local memories on one port of the local memories, and the each child is coupled via bus 112 to its local memory on the other port.

Instruction/data cache 124 is a dual port memory used by the parent processor for caching instructions and data from main memory. Buses 110 and 112 include address, data, write enable, and clock enable signal lines. The SG processor may then dynamically redistribute portions of the data cache address space to local memories. Data requests by the connected DP processors are then serviced as standard cache-line requests; cache-line fills and write-back are performed at the SG processor dual-port RAM port of memory 106-1, and DP access is performed at the DP processor port. In this manner, DP processor work unit distribution is performed part and parcel of cache operation. In particular, the SG processor performs no work-unit assembly/disassembly.

The scatter-gather processor (SGP) cache control block 122 distributes work unit data to the local cache memories 106-1-106-n in response to cache line requests from the child memory controllers 126-1-126-n. The child processors address data in the local cache memories as a contiguous data set based on main memory address space. Each child memory controller maps addressees of the main address space to addresses in the local RAMs 106-1-106-n used as distributed local caches. When a child memory controller (e.g., 126-1) detects a cache miss for data requested by the child processor, the SGP cache controller uses the pattern provided by the parent processor to read non-contiguous data from the parent instruction/data cache 124 and write that data as contiguous data in the local memory (e.g., 106-1).

The following paragraphs further explain the operation of the multiprocessor array 100 in regards to the scatter-gather of data for a unit of work designated as $WU_K$, which is the unit of work distributed to the $K^{th}$ child-processor, $DPP_K$. The SGP (parent) 102 passes a token to the SGP cache controller 122 via interfaces 132 and 134. The token specifies the establishment of cache distribution to the $DPP_K$ memory controller and includes the base address for the data of $WU_K$ and a scatter-gather template that specifies the pattern by which data is to be retrieved from main memory address space. The information in the token is provided to one of address generators 136-1-136-n. The address generator receiving the token information is coupled to the $DPP_K$ memory controller (e.g., 126-1). Subsequent N-associative cache line fills requested by the $DPP_K$ memory controller are performed relative to $WU_K$ base address and scatter-gather template. The token also conditions the selected address generator to listen to the child memory controller.

Along with the token to the SGP cache controller, the parent processor also passes a control token to $DPP_K$ (e.g., 104-1). The control token indicates $WU_K$ cache distribution to the local memory (e.g., 106-1) and is passed through a control data field residing at a reserved address in the local memory. The decoder (e.g., 142-1) monitors the bus 110 address lines for updates to the reserved address, and in response to an update, signals the child processor that the token has arrived via control register 144-1, for example. For each local memory 106-1-106-n there is a corresponding decoder 142-1-142-n.

The parent processor also passes a base address of $WU_K$ to the child processor (e.g., 104-1) via another reserved control field in the local memory (e.g., 106-1). The $WU_K$ base address is a main memory address used to base retrievals of $WU_K$ data from the main memory or instruction/data cache 124 of the parent processor to the local memory (e.g., 106-1) of the child processor (e.g., 104-1). The $DPP_K$ translates the $WU_K$ base address to an address in the local memory that is to be used for data of the $WU_K$. $DPP_K$ maps the distributed cache into its own local address space. This address space may be related to the corresponding SGP address space via the $WU_K$ base address. Thus, when the DPP memory controller requests a cache-line fill, it first translates the local cache address to the corresponding SGP cache address. Note: on both SGP and DPP sides, only the DMA (data) buffer is actually mapped to cache; DMA control fields reside at reserved (BRAM) memory locations accessible at local (i.e. non-cache) memory addresses.

Subsequent references by the child processor to $WU_K$ data are based off an arbitrary local base address maintained by the local memory controller, and the child processor views the $WU_K$ data set as occupying contiguous address space. The local memory controller effectively translates $WU_K$-based addresses to addresses in the local memory. In the case of a cache miss, the request is forwarded by the local memory controller to the corresponding address generator (e.g., 136-1) in the SGP cache controller 122; the request is first translated to the SGP cache address space based upon the $WU_K$ base address. The child memory controller uses cache memory map 156-1 to track which cache lines of $WU_K$ are present in the local memory. For a cache line fill request, the SGP cache controller uses the template for that child processor to retrieve the appropriate data from the parent instruction/data cache 124. The template may specify, for example, that the $WU_K$ for the child processor includes the word at every fourth address from the $WU_K$ base address. For example, if the $WU_K$ base address is 1024, the child processor references the $WU_K$ data as main memory addresses 1024, 1025, 1026, 1027, . . . . In response to a request to fill the first cache line, the SGP cache controller uses the template to retrieve words at addresses 1024, 1028, 1032, and 1036, assuming a 4 word cache line. These words are written to the local memory of the requesting child processor via bus 110 at the address provided by the local memory controller. The child memory controllers and SGP cache controller implement a handshake to coordinate cache lines fills, for example, miss signal to the SGP cache controller and a line-filled signal to the child memory controller upon completion.

Each child memory controller also signals the SGP cache controller in response to the child processor writing to an address that is part of $WU_K$. In an example embodiment, the child memory controller updates a write-back register in the corresponding address generator (e.g., 136-1) in the SGP cache controller. In response, the SGP cache controller reads from the local memory via bus 110, the cache line referenced by the write-back register.

In various alternative embodiments, it will be recognized that the SGP cache controller and child memory controllers may exchange various control information via reserved memory addresses in the child processors' local memories. These reserved addresses are separate from addresses used for caching $WU_K$ data. Thus, each decoder is coupled to an associated bank of control and status registers 158.

Upon completion of $WU_K$ processing, the child processor returns the cache-distribution token to the parent processor and disables the local memory. Prior to sub-cache distribution, the SGP cache controller maps all of cache address space to the instruction/data cache 124. When distributed, in response to the token from the parent processor, each sub-cache partition is re-mapped to a corresponding one of the local memories 106-1-106-n. Thereafter, the child memory controllers control the local memories as local caches. At completion, the sub-cache memory-map in the SGP cache controller is restored to the original mapping to the instruction/data cache 124. The parent processor signals the SGP cache controller to restore the original mapping in response to receipt of the token from the child processor. Sub-cache distribution on the child processor side involves dynamic re-mapping of the local memory to a contiguous main memory address space (local-to-main memory map 152-1). At completion, this mapping is restored to the original, non-cached address-space, after which no address translation and no handshakes with the SGP cache controller are required.

In other features of the multiprocessor array 100, the instruction/data cache 124 is implemented with a dual port memory, and the parent processor 102 has bussed connections to each of the ports as shown by signal lines 162, 164. Each of the child processors also has an associated dual port memory, 166-1-166-n that is available for use in processing that is associated with or separate from the processing of a work unit.

In various applications it may be observed that the distribution of the cache to multiple child processors according to the system of FIG. 1 may introduce contention for access to memory bus 110. The SGP cache controller 122 arbitrates access to main memory and the instruction data cache 124 for the parent processor 102 all the child memory controllers requesting cache lines. To mitigate the contention that may impact the parent processor, a system having a hierarchical bus structure may be implemented in accordance with further embodiments of the invention.

Figure 2:
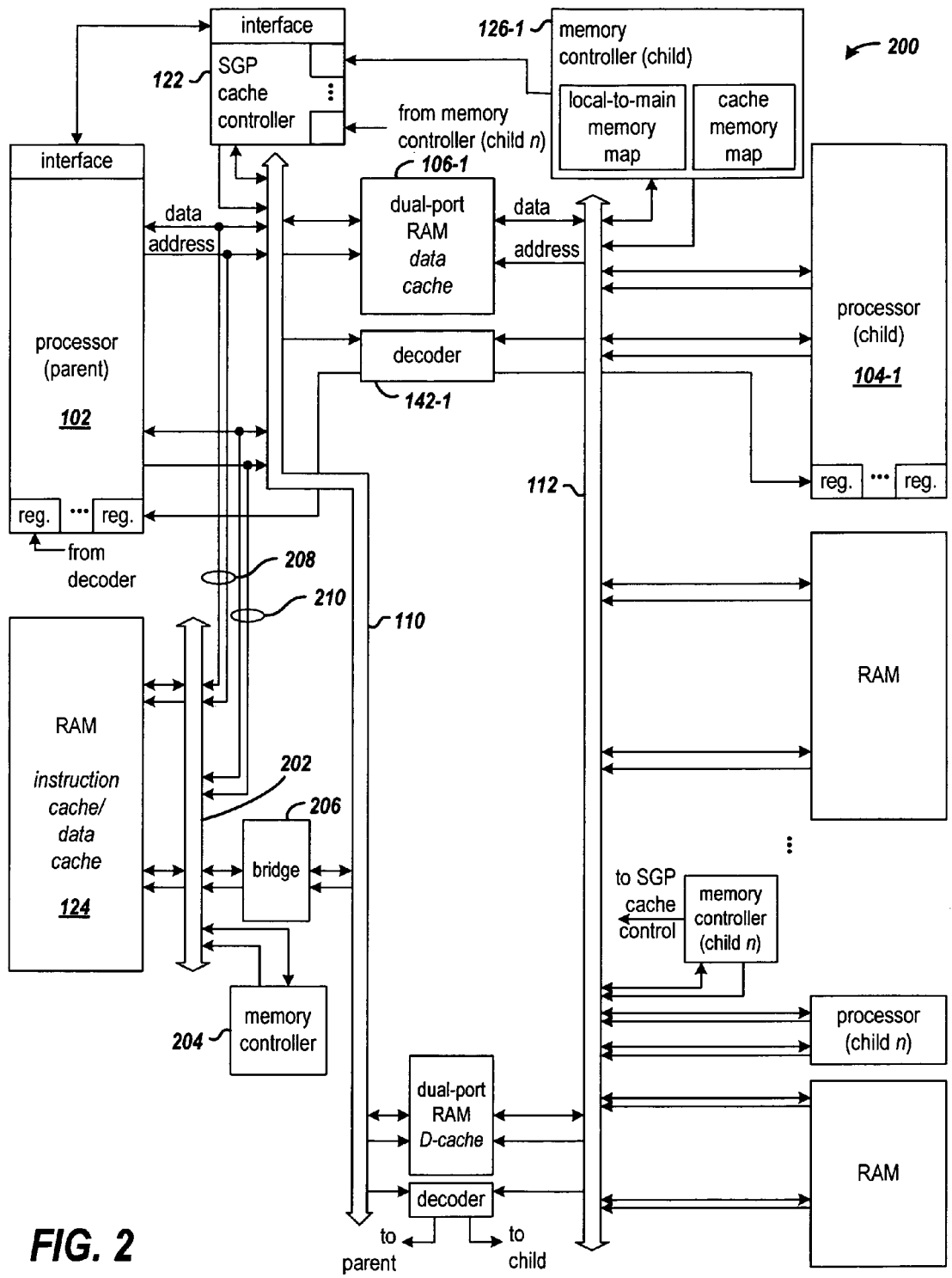
FIG. 2 is a block diagram that illustrates a multiprocessor array configured with a hierarchical memory bus in accordance with one or more embodiments of the invention.

FIG. 2 is a block diagram that illustrates a multiprocessor array 200 configured with a hierarchical memory bus in accordance with one or more embodiments of the invention. Most elements of the system 100 of FIG. 1 are also found in system 200 of FIG. 2. Generally, however, the system 200 additionally has bus 202, memory controller 204, and bridge 206. Note that some of the signal lines shown in FIG. 1 are not replicated in FIG. 2 in order to simplify the illustration. The memory controller 204 arbitrates access to the memory 124 for requests on bus 202. The parent processor is connected directly to bus 202, while the requests on bus 110 are passed through bridge 206. Thus, memory controller 204 arbitrates between a request presented by the bridge and requests on lines 208 and 210. The SGP cache controller 122 arbitrates requests on bus 110 such as those from child memory controllers 126-1-126-n.

Processor cache memory 124 access contention is then effectively limited to trans-bridge 206 access requests, typically in form of processor I-cache or non-distributed D-cache line-fill or write-back transactions. As indicated, processor memory access requests are propagated to both the SGP cache controller 122 and the local memory controller 204. The SGP cache controller 122 generates all cache line-fill and write-back transactions and applies supervisory control to the local memory controller for completion of memory READ/WRITE operations.

Figure 3:
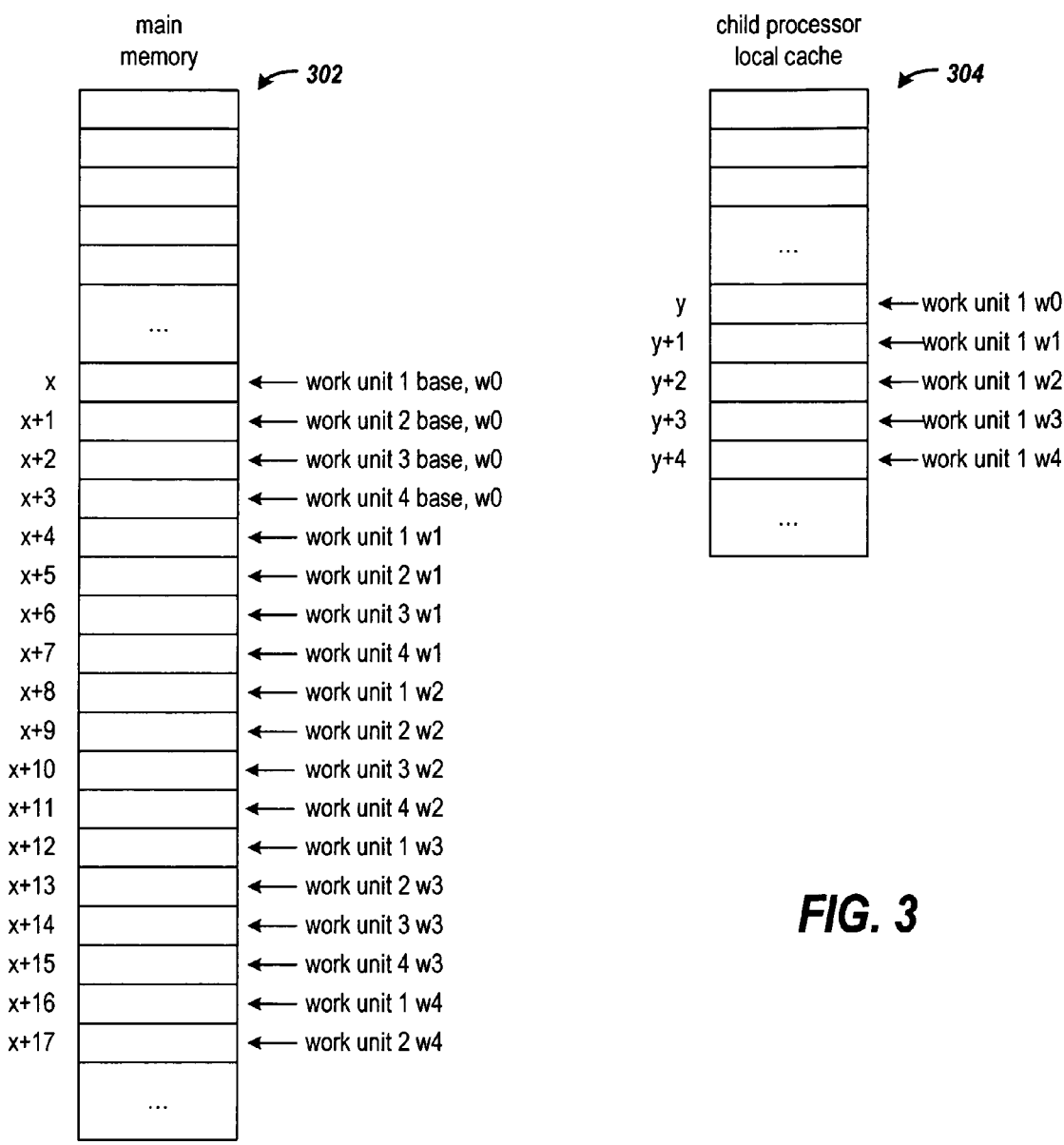
FIG. 3 illustrates the correspondence between data of units of work in main memory and a distributed subset of cached data to the local cache of a child processor.

FIG. 3 illustrates the correspondence between data of units of work in main memory 302 and a distributed subset of cached data to the local cache 304 of a child processor. The example work units in main memory 302 include work units 1, 2, 3, and 4. Word 0 ("w0") of work unit 1 is based at address x, word 0 of work unit 2 is based at address x+1, word 0 of work unit 3 is based at address x+2, and word 0 of work unit 4 is based at address x+3. Word 1 of the work units 1-4 follows the word 0 entries, beginning at address x+4. Thus, it can be seen that the words of a unit of work occupy every fourth address beginning at the base address. The words of data of each individual work unit are not contiguously addressed in the main memory.

With application of the various approaches of the present invention, the SGP cache controller uses respective templates defined for the child processors to retrieve non-contiguous data from main memory and store the data contiguously in the local cache memories of the child processors. For example, the words 0-4 of work unit 1 are stored at addresses y through y+4 in the child processor data cache 304. The child processor uses contiguous addresses x, x+1, x+2, x+3, x+4, . . . in referencing the words of work unit 1, even though the words of work unit 1 are not contiguously stored in the main memory. The child memory controller translates the main memory address submitted by the child processor into an address in the child processor's local cache. If the referenced word is present, the data is returned to the child processor. Otherwise, the child memory controller signals the SGP cache controller that a cache line is needed beginning at the address requested by the child processor. In response, the SGP cache controller uses the template associated with the child processor to read the appropriate addresses for a cache line, and writes the data to the contiguous addresses in the child processor's local cache.

Figure 4:
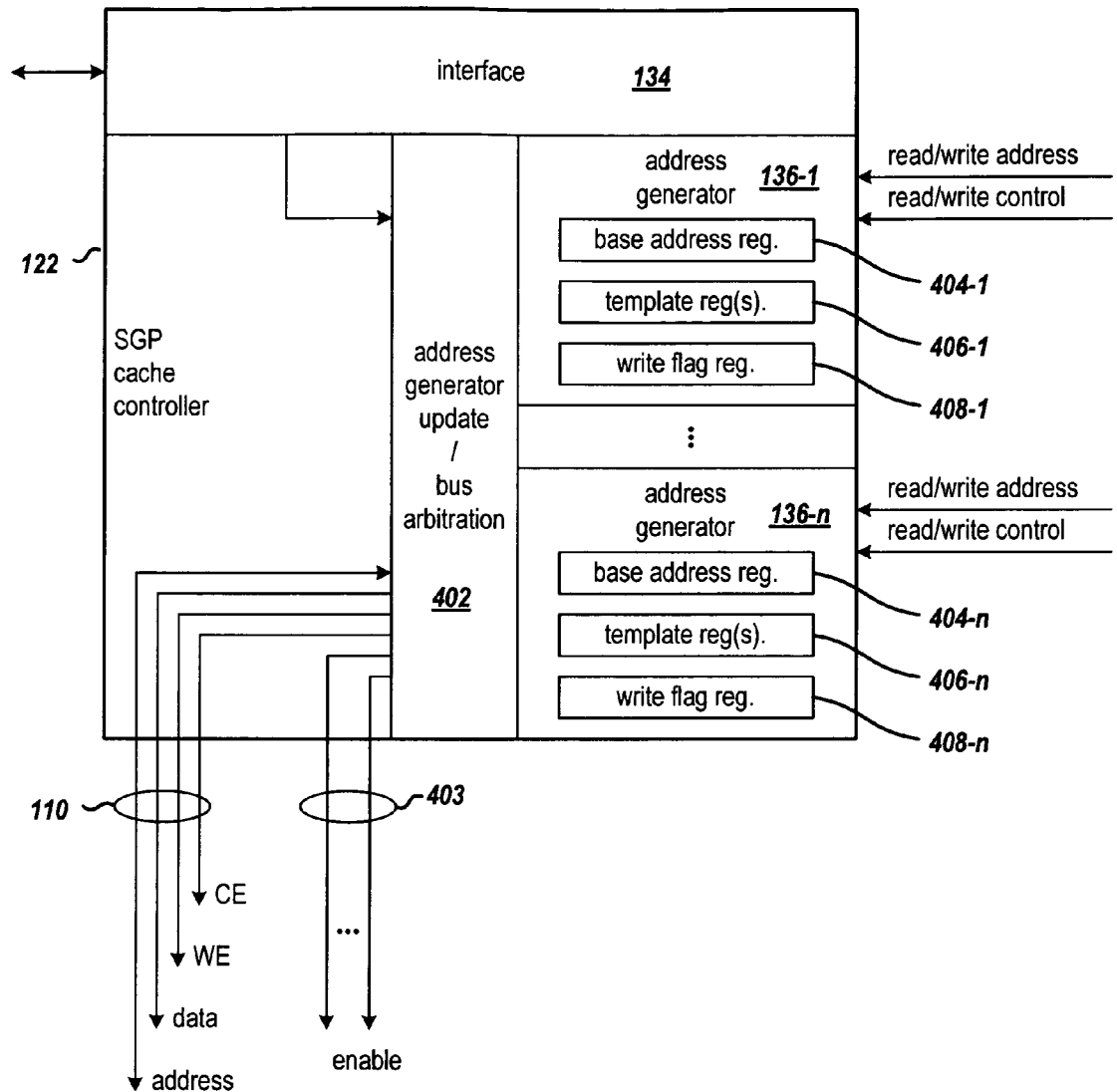
FIG. 4 is a block diagram that illustrates the data path and control of the scatter-gather processor (SGP) cache controller.

FIG. 4 is a block diagram that illustrates the data path and control of the scatter-gather processor (SGP) cache controller 122. The controller includes interface 134, address generators 136-1-136-n, and section 402 that controls updates to the control registers of the address generators and that arbitrates access to the bus 110 for requests by the parent processor and requests by the child processors submitted via the local cache controllers. Where a hierarchical bus architecture is employed as in FIG. 2, ancillary enable lines 403 are connected to any slave local memory controllers.

The base address registers 404-1-404-n and template registers 406-1-406-n in the address generators are updated in response to cache distribution tokens from the parent processor. Each base address register stores the base address for words of a work unit assigned to a respective child processor. Each template register specifies a pattern by which the SGP cache controller is to retrieve a cache line of data for the child processor's local memory. The pattern may be as simple or as complex as the application requires. Multiple template registers may be used for each address generator if needed.

The write flag registers 408-1-408-n in the address generators are updated by the respective local memory controllers in response to updates of cached work unit data by the child processors. In response to the write flag register being set, the SGP cache controller reads a cache line from the local memory at an address provided by the signaling local memory controller and thereafter writes the cache line data to the main memory according to the pattern specified by the template register.

The SGP cache controller also arbitrates access to the bus 110 for requests from the various child processors and from the parent processor. A suitable arbitration approach may be selected according to application requirements.

Figure 5:
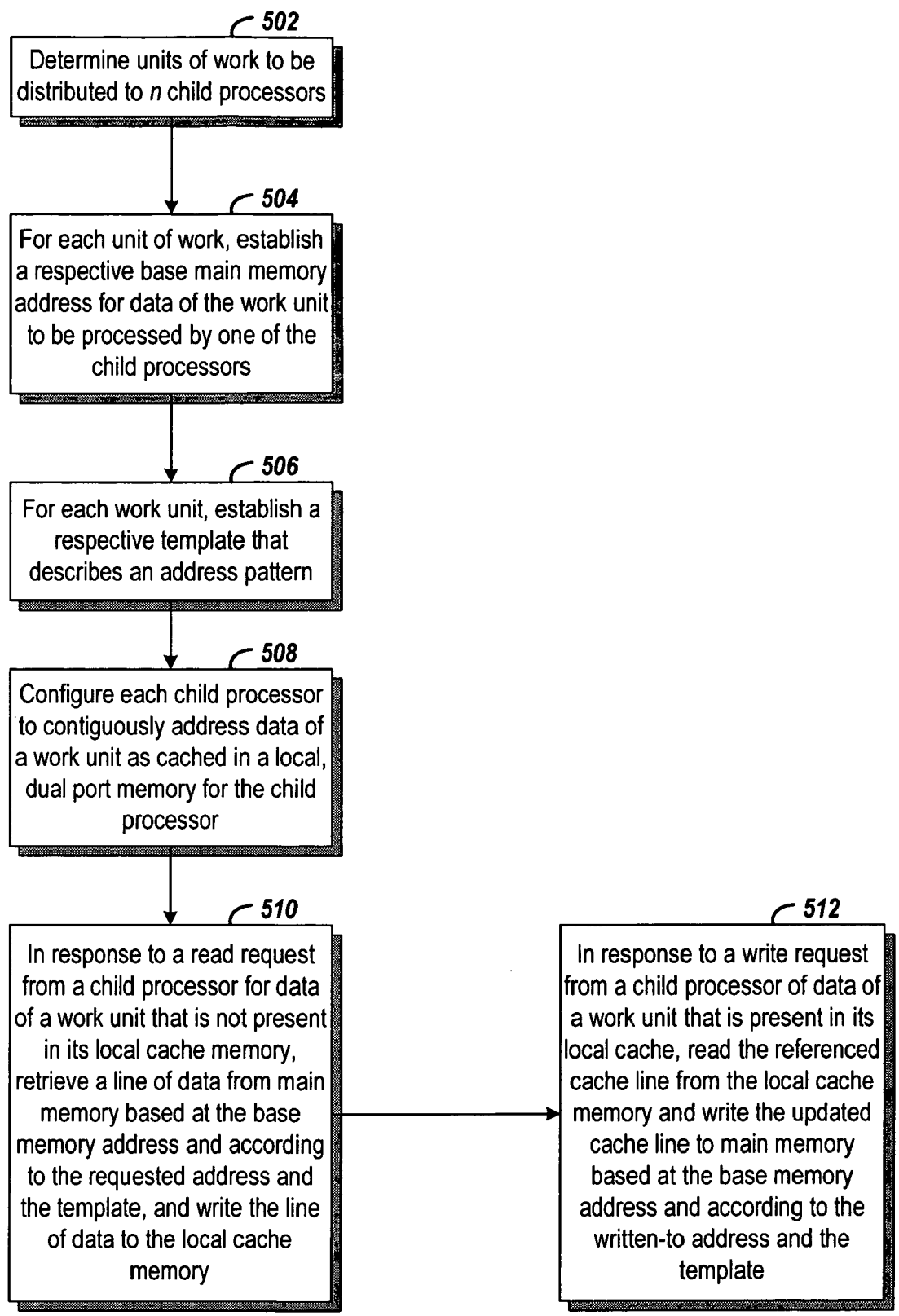
FIG. 5 is a flowchart of an example process for operating a multiprocessor array in accordance with one or more embodiments of the invention.

FIG. 5 is a flowchart of an example process for operating a multiprocessor array in accordance with one or more embodiments of the invention. The process commences with the parent processor determining the units of a work unit to be distributed to n child processors (step 502). The division of the units of work amongst the processors is application dependent. For each work unit, a respective base main memory address is established for data of the work unit to be processed by one of the child processors (step 504). Also, a template is established for each work unit for data of the work unit (step 506). As explained above, the template specifies the pattern in main memory by which the work unit data is stored. Each child processor is configured to contiguously address data of its assigned work unit (step 508). The addresses used by the child processors are main memory addresses, and the main memory addresses are mapped to local memory units. Each local memory unit functions as a local memory for the work unit assigned to the associated child processor. In response to a read request from a child processor for data of a work unit that is not present in its local memory, the base main memory address is used to base retrieval of a line of data to the local cache according to requested address and the template (step 510). In response to a write request from a child processor of data of a work unit that is present in its local cache, the associated cache line is read from contiguous addresses in the local memory and written to non-contiguous addresses in the main memory according to the template (step 512).

Figure 6:
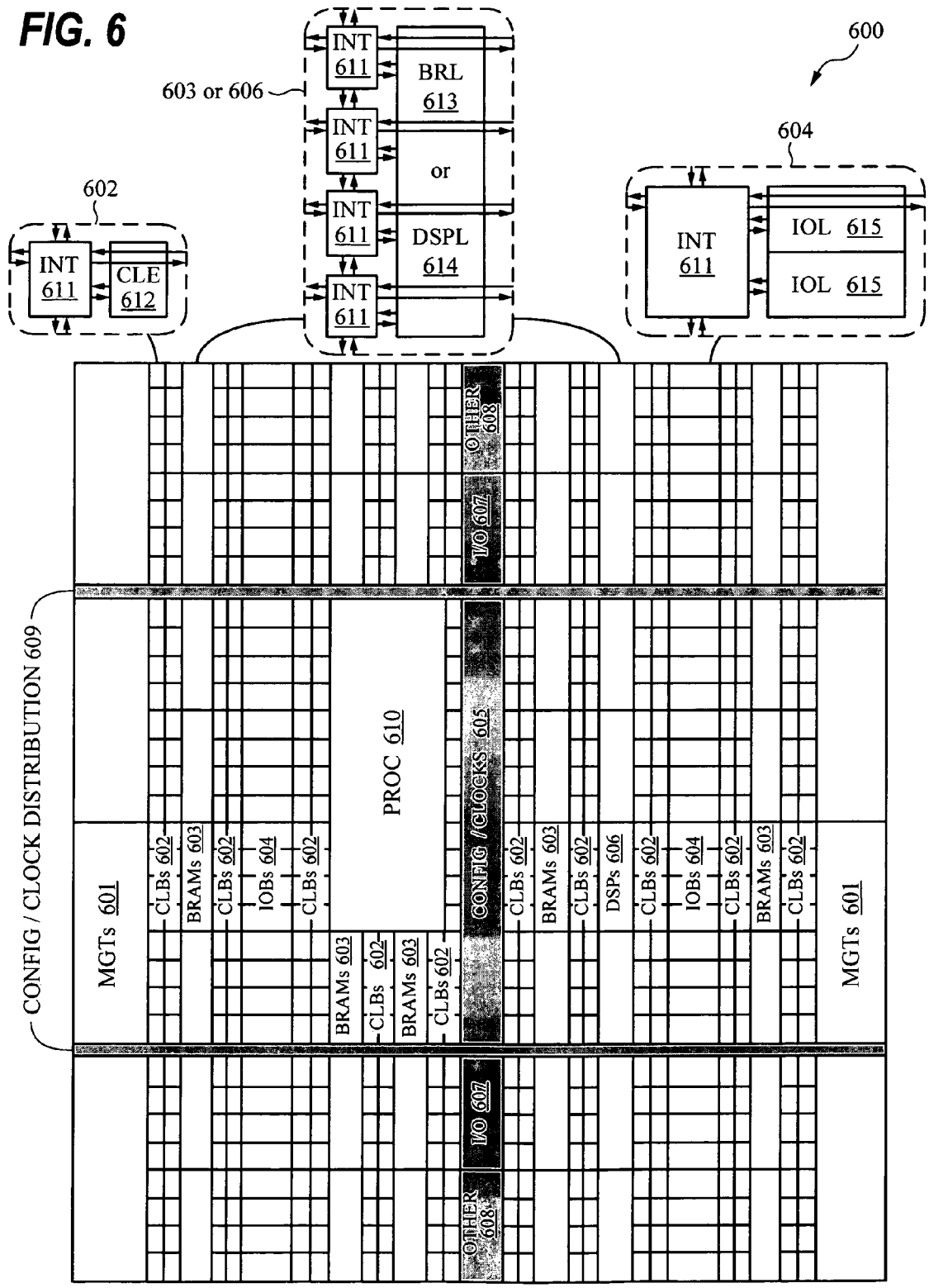
FIG. 6 illustrates a field programmable gate array (FPGA) architecture on which various embodiments of the invention may be implemented.

FIG. 6 illustrates a field programmable gate array (FPGA) architecture on which various embodiments of the invention may be implemented. For example, the parent and child processors may be implemented on an FPGA using an implementation-specific combination of processors that are integrated as hardwired circuits and processors that are implemented using the configurable logic of the FPGA. In addition, the cache and memory controllers may also be implemented using configurable logic of the FPGA. RAM resources of the FPGA may be used to implement one or more of the memory structures used by the processors. Those skilled in the art will also recognize that various combinations of ASICs, FPGAs, and processor ICs, and memory ICs may be used to implement the invention to achieve desired design objectives.

Advanced FPGAs can include several different types of programmable logic blocks in the array. The example FPGA 600 that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607) (e.g., configuration ports and clock ports), and other programmable logic 608 such as digital clock managers, analog-to-digital converters, system monitoring logic, and so forth. Some FPGAs also include dedicated processor blocks (PROC 610).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element (INT 611) also includes the connections to and from the programmable logic element within the same tile, as shown by the examples included at the top of FIG. 6.

For example, a CLB 602 can include a configurable logic element (CLE 612) that can be programmed to implement user logic plus a single programmable interconnect element (INT 611). A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element (INT 611). As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

It will be appreciated that PLDs having different layouts of CLBs, IOBs, and interconnect circuitry (and the functional equivalents thereof) may also implement the various embodiments of the invention described herein. The present invention is thought to be applicable to a variety of multiprocessor array systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. An electronic system, comprising:
a plurality of processors, at least one of the plurality of processors configured as a parent processor, and at least two of the plurality of processors configured as child processors of the parent processor,
wherein the parent processor is configured to determine an address translation pattern for each of the child processors and respective sets of data to be processed by the child processors;
a data cache coupled to the parent processor;
at least two dual port memories respectively associated with the at least two child processors, each dual port memory having a first port coupled to the data cache, and a second port coupled to the associated child processor; and
a parent cache controller coupled to the parent processor, to the data cache, and to the first port of each dual port memory, the parent cache controller configured to read, in response to a memory request from a child processor and the address translation pattern from the parent processor, a set of data from non-contiguous addresses of the data cache according to the address translation pattern, and write the set of data to contiguous addresses of the dual port memory associated with the requesting child processor.

2. The system of claim 1, wherein the parent cache controller is configured to read a contiguously addressed set of data from the dual port memory associated with a child processor and write the set of data to non-contiguous addresses in the data cache according to the address translation pattern, responsive to an update to the set of data.

3. The system of claim 1, wherein the parent processor is configured to communicate the address translation pattern to the parent cache controller.

4. The system of claim 3, further comprising:
at least two child memory controllers respectively coupled to the at least two dual port memories and respectively coupled to the at least two child processors;
wherein the parent processor is further configured to communicate a respective work unit base address to each of the at least two child processors, and each child memory controller is configured to map a respective work unit base address to an address in the dual port memory associated with the associated child processor.

5. The system of claim 4, further comprising:
wherein the parent processor is configured to communicate to the parent cache controller, one or more instructions to distribute cache to the at least two dual port memories;
wherein the parent cache controller is configured to map cache address space to the at least two dual port memories response to the one or more instructions to distribute cache; and
wherein each child processor is configured to communicate to the parent processor completion of processing of the respective set of data, and the parent processor is configured to signal the parent cache controller to restore mapping of cache address space to the data cache in response to completion of the of processing of the respective sets of data.

6. The system of claim 5, further comprising:
wherein the parent processor is configured to write, for each child processor, the work unit base address to a respective reserved word in the local memory associated with the child processor; and
wherein each child processor is configured to read from the respective reserved word in the associated local memory.

7. The system of claim 6, further comprising:
a first memory bus coupled to the parent processor, parent cache controller, and the first port of each dual port memory;
at least two secondary memory buses, each secondary memory bus coupled to the second port of a respective one of the dual port memories, a respective child memory controller, and a respective child processor; and
at least two decoders, each decoder coupled to the first memory bus, a respective one of the secondary memory buses, and a respective one of the child processors, wherein each decoder is configured to detect a write to the reserved word by the parent processor and in response to detecting the a write to the reserved word signal the coupled child processor that the reserved word has been written to.

8. The system of claim 5, further comprising:
wherein each child processor is further configured to write to a respective reserved word in the local memory associated with the child processor data that indicates completion of processing of the respective set of data; and
wherein the parent processor is configured to read from each reserved word.

9. The system of claim 1, further comprising:
a first memory bus coupled to the parent processor, parent cache controller, and the first port of each dual port memory;
at least two secondary memory buses, each secondary memory bus coupled to the second port of a respective one of the dual port memories, a respective child memory controller, and a respective child processor;
a third memory bus coupled to the parent processor and to the data cache;
a parent memory controller coupled to the third bus, wherein the parent memory controller arbitrates access to the data cache for requests on third memory bus; and
a bridge coupled between the first memory bus and the third memory bus.

10. The system of claim 9, wherein the parent cache controller is configured to read a contiguously addressed set of data from the dual port memory associated with a child processor and write the set of data to non-contiguous addresses in the data cache according to the address translation pattern, responsive to an update to the set of data.

11. The system of claim 10, wherein the parent processor is configured to communicate the address translation pattern to the parent cache controller.

12. The system of claim 11, further comprising:
at least two child memory controllers respectively coupled to the at least two dual port memories and respectively coupled to the at least two child processors; and
wherein the parent processor is further configured to communicate a respective work unit base address to each of the at least two child processors, and each child memory controller is configured to map a respective work unit base address to an address in the dual port memory associated with the associated child processor.

13. The system of claim 12, further comprising:

wherein the parent processor is configured to communicate to the parent cache controller, one or more instructions to distribute cache to the at least two dual port memories;

wherein the parent cache controller is configured to map cache address space to the at least two dual port memories response to the one or more instructions to distribute cache; and wherein each child processor is configured to communicate to the parent processor completion of processing of the respective set of data, and the parent processor is configured to signal the parent cache controller to restore mapping of cache address space to the data cache in response to completion of the of processing of the respective sets of data.

14. The system of claim 13, further comprising:

wherein the parent processor is configured to write, for each child processor, the work unit base address to a respective reserved word in the local memory associated with the child processor; and wherein each child processor is configured to read from the respective reserved word in the associated local memory.

15. The system of claim 14, further comprising:

a first memory bus coupled to the parent processor, parent cache controller, and the first port of each dual port memory;

at least two secondary memory buses, each secondary memory bus coupled to the second port of a respective one of the dual port memories, a respective child memory controller, and a respective child processor; and at least two decoders, each decoder coupled to the first memory bus, a respective one of the secondary memory buses, and a respective one of the child processors, wherein each decoder is configured to detect a write to the reserved word by the parent processor and in response to detecting the a write to the reserved word signal the coupled child processor that the reserved word has been written to.

16. A method for distributing a plurality of sets of data for processing, comprising:

for each set of data, determining a main base memory address and an associated template that describes a non-contiguous pattern of addressing each word in the set of data in main memory;

communicating each main base memory address from a parent processor to a respective one of a plurality of child processors, wherein each set of data is assigned to and associated with a respective one of the child processors;

contiguously addressing by each child processor in a respective local memory coupled to the child processor, words of the set of data associated with the child processor; and in response to a read request from a child processor, the read request including an address that references a word in the set of data associated with the child processor and the referenced word not being present in the local memory of the child processor, reading from main memory addresses a plurality of words of the data set including the referenced word, wherein addresses of the plurality of words are non-contiguous according to the pattern of addressing for the set of data, and writing the plurality of words of data to contiguous addresses of the local memory of the child processor.

17. The method of claim 16, further comprising in response to a word of the set of data associated with child processor being present in the local memory of the child processor and having been written to by the child processor, reading by a parent cache controller from the local memory, a plurality of contiguously addressed words including the written to word, and writing by the parent cache controller the plurality of words to non-contiguous main memory addresses according to the pattern of addressing the set of data.

18. The method of claim 17, further comprising:

writing to respective reserved words in the local memories by the parent processor, the main base memory addresses of the sets of data; and reading the main base memory addresses from the respective reserved words in the local memories by the child processors.

19. The method of claim 18, further comprising:

monitoring for addresses of the reserved words on respective memory buses coupled to the local memories; and signaling a child processor in response to detecting on the memory bus coupled to the local memory, the address of the reserved word in the local memory of the child processor.

20. An apparatus for distributing a plurality of sets of data for processing, comprising:

means for determining for each set of data, a main base memory address and an associated template that describes a non-contiguous pattern of addressing each word in the set of data in main memory;

means for communicating each main base memory address from a parent processor to a respective one of a plurality of child processors, wherein each set of data is assigned to and associated with a respective one of the child processors;

means for contiguously addressing by each child processor in a respective local memory coupled to the child processor, words of the set of data associated with the child processor; and means, responsive response to a read request from a child processor, the read request including an address that references a word in the set of data associated with the child processor and the referenced word not being present in the local memory of the child processor, for reading from main memory addresses a plurality of words of the data set including the referenced word, wherein addresses of the plurality of words are non-contiguous according to the pattern of addressing for the set of data, and for writing the plurality of words of data to contiguous addresses of the local memory of the child processor.

* * * * *